United States Patent [19]
Haas

[11] Patent Number: 6,122,286
[45] Date of Patent: Sep. 19, 2000

[54] METHOD OF CONTROLLING ACCESS TO A TRANSMISSION CHANNEL JOINTLY USED BY A PLURALITY OF DATA SOURCES

[75] Inventor: Peter Haas, Forstinning, Germany

[73] Assignee: Siemens Aktiengesellschaft, Munich, Germany

[21] Appl. No.: 09/174,732

[22] Filed: Oct. 19, 1998

Related U.S. Application Data

[63] Continuation of application No. PCT/DE97/00685, Apr. 3, 1997.

[30] Foreign Application Priority Data

Apr. 18, 1996 [DE] Germany .............................. 196 15 411

[51] Int. Cl.[7] ....................................................... H04J 3/02
[52] U.S. Cl. ............................................ 370/462; 370/447
[58] Field of Search ..................................... 370/445, 447, 370/461, 462, 438, 444

[56] References Cited

U.S. PATENT DOCUMENTS

| | | | |
|---|---|---|---|
| 4,543,654 | 9/1985 | Jones ........................................ | 370/445 |
| 4,726,018 | 2/1988 | Bux et al. ................................. | 370/455 |
| 5,721,726 | 2/1998 | Kurnick et al. .......................... | 370/236 |

*Primary Examiner*—Hassan Kizou
*Assistant Examiner*—Mitchell Slavitt
*Attorney, Agent, or Firm*—Herbert L. Lerner; Laurence A. Greenberg; Werner H. Stemer

[57] ABSTRACT

The method deals with the transmission of data frames that comprise address information, useful data, and a check sequence, through a transmission channel. The data sources evaluate a data collision signal whose value corresponds to the logic AND combination of all the output signals of all the data sources using the transmission channel. Each data source transmits, between two data frames, an idle bit sequence, which is given by a sequence of logic one values in the event of non-identity between the output signal of the data source and the data collision signal, and is given by a FLAG signal after the complete transmission of a data frame or after the abortion of the transmission of a data frame or if the data collision signal contained in direct succession a larger number of logic one values than the transmission abort signal.

3 Claims, 2 Drawing Sheets

| M | OF | Ad | Dat | C | CF | M | OF | Ad | Dat | OF | Ad | Dat | C | CF | M |

Fig. 2a

PRIOR ART

| M | IF | Ad | Dat | C | IF | Ad | Dat | C | IF | Ad | Dat | C | IF |

METHOD OF CONTROLLING ACCESS TO A TRANSMISSION CHANNEL JOINTLY USED BY A PLURALITY OF DATA SOURCES

CROSS-REFERENCE TO RELATED APPLICATION

This is a continuation of copending International Application PCT/DE97/00685, filed Apr. 3, 1997, which designated the United States.

BACKGROUND OF THE INVENTION

FIELD OF THE INVENTION

In a variety of data transmission applications, it is necessary to control the access to a transmission channel jointly used by a plurality of data sources. This is the case for example during the concentration of the packet data (HDLC frames) of the individual ISDN subscribers of a digital telephone switching system onto PCM time slots at 64 kbit/s (Bd channels). There, the HDLC frames of a plurality of assemblies (data sources) have to be transmitted via one Bd channel (transmission channel).

In order to control access authorization, a method is used at the present time in which an OPEN FLAG is transmitted before each HDLC frame (data frame) and a CLOSE FLAG is transmitted after each HDLC frame, and in which an uninterrupted sequence of logic one values (MARK) is always transmitted as IDLE code. This prior art method has the disadvantage that the IDLE code (idle bit sequence) that is transmitted is not a sequence of FLAG signals, for example "01111110", but rather MARK, even though the IDLE code "FLAG" is prescribed in many transmission protocols. A data stream transmitted by means of the known method must therefore be post-processed in a suitable manner in order to satisfy the specifications of many transmission protocols.

SUMMARY OF THE INVENTION

It is accordingly an object of the invention to provide a novel access control method defining the access of several data sources to a commonly used transmission channel, which overcomes the above-mentioned disadvantages of the heretofore-known devices and methods of this general type and which does away with the previously required post-processing.

With the foregoing and other objects in view there is provided, in accordance with the invention, a method of controlling access to a transmission channel jointly used by a plurality of data sources, which comprises:

transmitting, with each of a plurality of data sources, data frames with address information, useful data, and a check sequence;

forming a logic AND combination of all output signals of the plurality of data sources through the transmission channel;

evaluating, with the data sources, a data collision signal having a value corresponding to the logic AND combination;

transmitting with each of the plurality of data sources, between two data frames, an idle bit sequence, which is a) a sequence of logic one values if the output signal of the data source and the data collision signal are not identical; and b) a FLAG signal after a complete transmission of a data frame or after a transmission of a data frame has been aborted, or if the data collision signal contained in direct succession a greater number of logic one values than a transmission abort signal.

In accordance with an added feature of the invention, two priority levels are defined for the transmission of data via the transmission channel. The two priority levels are:

a) 0, corresponding to a high priority in which transmission is enabled when the data collision signal corresponds to a sequence of n FLAG signals; and b) 1, corresponding to a low priority in which transmission is enabled when the data collision signal corresponds to a sequence of n+1 FLAG signals;

where c) n=1 in event of a common OPEN/CLOSE FLAG; and d) n=2 in event of separate OPEN and CLOSE FLAGS.

In accordance with an additional feature of the invention, a priority level is changed in each data source as follows:

a) starting each data source with the priority 0;

b) changing each data source to the priority 1 after a complete transmission of a data frame;

c) changing all the data sources to the priority 0 if the data collision signal assumes the value 1.

In accordance with a concomitant feature of the invention, the following IDLE flags are generated:

a) the first to nth IDLE flag with an 8-bit sequence "01111110";

b) the n+1-th and all further IDLE flags with a 7-bit sequence "1111110";

where c) n=1 in event of a common OPEN/CLOSE FLAG; and d) n=2 in event of separate OPEN and CLOSE FLAGS.

In other words, the objects of the invention are satisfied in that each data source transmits, between two data frames, an idle bit sequence (IDLE FLAG) which is given by a sequence of logic one values in the event of non-identity between the output signal of this data source and the data collision signal, or by a FLAG signal after the complete transmission of a data frame or after the abortion of the transmission of a data frame, or if the data collision signal contained in direct succession a larger number of logic one values than the transmission abortion signal (ABORT).

The invention is not, of course, restricted to the concentration of the packet data (HDLC frames) of the individual ISDN subscribers of a digital telephone switching system. After perusal of the present description, it will be understood by those of skill in the art that the invention can be employed in numerous similar technical situations. With the aid of his general expert knowledge, it will not be difficult for a person skilled in the art, after perusal of the present description, to find corresponding variations of the present invention.

Other features which are considered as characteristic for the invention are set forth in the appended claims.

Although the invention is illustrated and described herein as embodied in a method for controlling the access to a transmission channel jointly used by a plurality of data sources, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2A is a schematic data sequence of transmitted data frames and flags in a prior art aggregate channel.

FIG. 2B is a schematic data sequence of transmitted data frames and flags in the aggregate channel in the method according to the invention.

Figure 1:
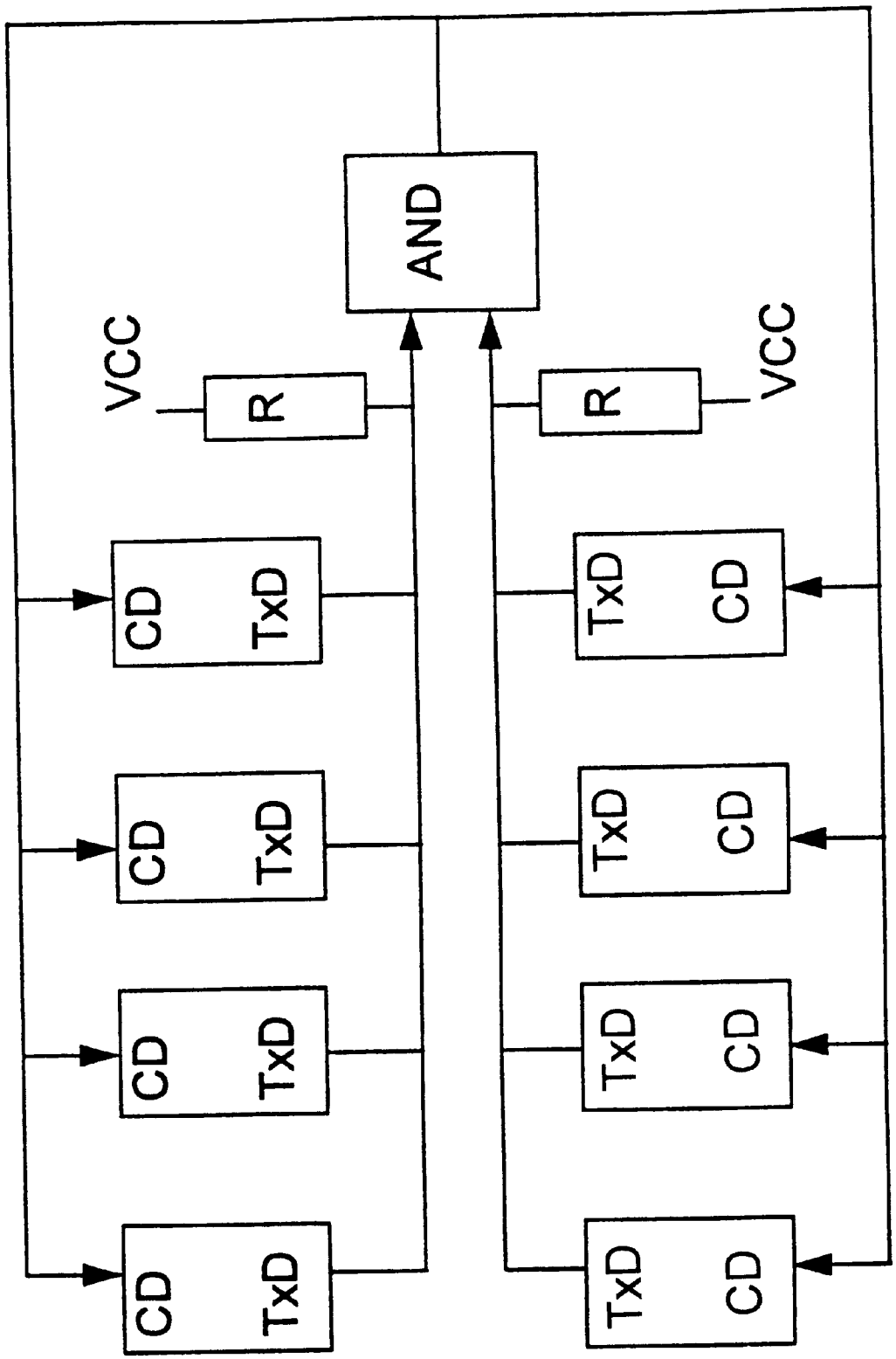
FIG. 1 is a diagrammatic view of a possible bus configuration to which the invention applies.

The following changes to the drawings have been approved by the examiner and agreed upon by the applicant: The changes to FIG. 2 have been marked in red and the drawing is attached to this Examiner's Amendment. In order to avoid abandonment of the application, applicant must make these above agreed upon drawing changes.

DESCRIPTION OF THE PREFERRED EMBODIMENTS

Referring now to the figures of the drawing in detail and first, generally, to FIG. 1 thereof, VCC designates a supply voltage and R designates a pull-up resistor. The label AND stands for a logic AND function.

In the sequence of transmitted data frames and flags in the aggregate channel the symbols denote the following bit patterns:

| | |
|---|---|
| M | MARK |
| OF | Open flag |
| Ad | Address |
| Dat | Data of the frames |
| C | CRC checksum |
| CF | Close flag |
| IF | Idle flag |

In order to keep the description of the present invention simple and clear, the invention is described below predominantly with reference to the example of the concentration of the packet data (HDLC frames) of the individual ISDN subscribers of a digital telephone switching system.

In the digital line unit (DLU, digital subscriber line unit) of a digital switching system, the packet data (HDLC frames) of the individual ISDN subscribers are concentrated onto PCM time slots at 64 kbit/s (Bd channels, that is to say B channels, which are used for the transmission of D channel information). During the concentration, the HDLC frames of a plurality of assemblies must be transmitted into one BD channel. In order to control access authorization to the Bd channel, according to the prior art a collision method is used which is based on the following principle (prior art):

(1) All the data sources (transmitters) are connected by their data outputs (TxD) via an open-collector bus and/or by logic AND functions (see FIG. 1). In this case, a logic zero is asserted relative to any logic ones that are present.
(2) The IDLE code that is transmitted is always MARK (permanent position at logic one).
(3) The aggregate signal of all the transmitters is passed back to all the transmitters as a Collision Data signal (CD) (see FIG. 1).
(4) There are two priority levels for the transmission of data on the Bd channel:
   a) 0=high priority Transmission is enabled when the last 8 bits in succession have been detected with '1' on CD.
   b) 1=low priority Transmission is enabled when the last 10 bits in succession have been detected with '1' on CD.
(5) The priority levels are changed as follows:
   a) Each transmitter begins with the priority 0.
   b) After the complete transmission of an HDLC frame, a change to the priority 1 is made.
   c) If the transmission enable for priority 1 is detected on CD, then all the transmitters change back to priority 0.
(6) A transmitter with access authorization transmits its data via TxD and compares each transmitted bit with the aggregate signal on CD. If non-identity is detected, then the transmission of the frames is aborted. The aborted HDLC frame must be completely repeated in the event of the next transmission enable.
(7) All the HDLC frames are transmitted with Open and Close flags.

According to this principle, HDLC frames having a large number of zeros at the start of the address field are asserted relative to other HDLC frames within the same priority level. Since the priority is increased after the complete transmission of a HDLC frame, it is ensured that all the transmitters can transmit their frames. The advantage of this method is that when collisions occur, a transmitter is always asserted and can transmit its frame free from errors. A disadvantage of this known method, however, is that MARK is transmitted, rather than FLAGs ("01111110"), as idle code between the HDLC frames. Since the idle code FLAG is prescribed in many transmission protocols, a data stream produced by the method described must be post-processed in order to satisfy the protocol specifications.

It is here that the invention provides a remedy by means of the following measures (method according to the invention):

The existing method is changed and supplemented in terms of the following points:
(2) Different idle codes are transmitted:
   a) MARK is transmitted whenever non-identity between TxD and CD occurs.
   b) FLAG is transmitted after the complete transmission of an HDLC frame or after abortion of a frame by ABORT ("11111111"). In this case, the first to nth FLAG is specified by the bit sequence "01111110" (8 bits), and all of the further FLAGs starting from the n+1-th are specified by the bit sequence "1111110" (7 bits). In this case,
      b1) n=1 in the event of a common OPEN/CLOSE FLAG; and
      b2) n=2 in the event of separate OPEN and CLOSE FLAGS.
   c) FLAG is also transmitted if the number of bits in succession with '1' that are identified on CD is more than the number of '1's in the case of an ABORT.
(4) There are two priority levels for the transmission of data on the Bd channel:
   a) 0=high priority Transmission is enabled when n flags have been detected on CD.
   b) 1=low priority Transmission is enabled when n+1 flags have been detected on CD.
   In this case,
   c) n=1 in the event of a common OPEN/CLOSE FLAG and
   d) n=2 in the event of separate OPEN and CLOSE FLAGS.
(7) The HDLC frames are transmitted without open and close flags since the required flags are already produced by the idle code.
(8) If a '1' is detected on CD after the transmission of a '0', then a line interruption is manifest and the TxD pin is switched off permanently (that is to say till acknowledgment by the software).

Since flags are transmitted as idle code between the frames (see FIG. 2) in the case of the method according to the invention, post-processing of the data stream can be obviated. Furthermore, the transmission capacity is increased by the method according to the invention since the 8 '1's between the close and the open flag are dispensed with. In addition, it is possible to effect transmission with just one flag between two frames (optional). Moreover, continual monitoring of the bus system takes place as a result of the transmission of the flags.

What is claimed is:

1. A method of controlling access to a transmission channel jointly used by a plurality of data sources, which comprises:

transmitting, with each of a plurality of data sources, data frames with address information, useful data, and a check sequence;

forming a logic AND combination of all output signals of the plurality of data sources through the transmission channel;

evaluating, with the data sources, a data collision signal having a value corresponding to the logic AND combination;

transmitting with each of the plurality of data sources, between two data frames, an idle bit sequence, which is
 a) a sequence of logic one values if the output signal of the data source and the data collision signal are not identical; and
 b) a FLAG signal after a complete transmission of a data frame or after a transmission of a data frame has been aborted, or if the data collision signal contained in direct succession a greater number of logic one values than a transmission abort signal; and defining two priority levels for the transmission of data through the transmission channel, the priority levels being:
 0, corresponding to a high priority in which transmission is enabled when the data collision signal corresponds to a sequence of n FLAG signals; and
 1, corresponding to a low priority in which transmission is enabled when the data collision signal corresponds to a sequence of n+1 FLAG signals;

where
 n=1 in event of a common OPEN/CLOSE FLAG; and
 n=2 in event of separate OPEN and CLOSE FLAGS.

2. The method according to claim 1, which comprises changing a priority level in each data source according to:
 a) starting each data source with the priority 0;
 b) changing each data source to the priority 1 after a complete transmission of a data frame;
 c) changing all the data sources to the priority 0 if the data collision signal assumes the value 1.

3. A method of controlling access to a transmission channel jointly used by a plurality of data sources, which comprises:

transmitting, with each of a plurality of data sources, data frames with address information, useful data, and a check sequence;

forming a logic AND combination of all output signals of the plurality of data sources through the transmission channel;

evaluating, with the data sources, a data collision signal having a value corresponding to the logic AND combination;

generating an idle bit sequence with
 the first to nth IDLE flag having an 8-bit sequence "01111110" and
 the n+1-th and all further IDLE flags having a 7-bit sequence "1111110", where
 n=1 in event of a common OPEN/CLOSE FLAG and
 n=2 in event of separate OPEN and CLOSE FLAGS; and transmitting with each of the plurality of data sources, between two data frames, the idle bit sequence, which is
 a) a sequence of logic one values if the output signal of the data source and the data collision signal are not identical; and
 b) a FLAG signal after a complete transmission of a data frame or after a transmission of a data frame has been aborted, or if the data collision signal contained, in direct succession, a greater number of logic one values than a transmission abort signal.

* * * * *